(12) United States Patent
McGarry

(10) Patent No.: US 7,740,554 B2
(45) Date of Patent: Jun. 22, 2010

(54) MOTORCYCLE CHAIN GUIDE

(75) Inventor: Timothy McGarry, Phoenix, OR (US)

(73) Assignee: T.M. Designworks, LLC, Phoenix, OR (US)

( * ) Notice: Subject to any disclaimer, the term of this patent is extended or adjusted under 35 U.S.C. 154(b) by 900 days.

(21) Appl. No.: 11/251,472

(22) Filed: Oct. 14, 2005

(65) Prior Publication Data

US 2007/0087877 A1   Apr. 19, 2007

(51) Int. Cl.
F16H 57/02 (2006.01)
F16H 7/18 (2006.01)
(52) U.S. Cl. ...................... 474/144; 474/140
(58) Field of Classification Search ............... 474/144, 474/140, 141; D12/127
See application file for complete search history.

(56) References Cited

U.S. PATENT DOCUMENTS

D216,575 S  *  2/1970  Hill ........................... D12/127
D367,250 S  *  2/1996  Kartchner ................. D12/127
2005/0159260 A1* 7/2005 Gogo ........................ 474/111

FOREIGN PATENT DOCUMENTS

JP                520637 B     *    5/1993

OTHER PUBLICATIONS

Honda Chain Guide Bracket, 2 pages, Jan. 2005 (approximately).
KTM Chain Guide Bracket, 2 pages, 2006 (approximately).
Yamaha Chain Guide Bracket, 2 pages, 2000-2001 (approximately).
T.M. Designworks Chain Guide Bracket, 2 pages, Jul. 1999 (approximately).

* cited by examiner

Primary Examiner—John Q Nguyen
Assistant Examiner—Robert T Reese
(74) Attorney, Agent, or Firm—Alleman Hall McCoy Russell & Tuttle LLP

(57) ABSTRACT

A chain guide for guiding a chain traveling around a sprocket supported on a frame of a motorcycle is disclosed. Typically, the chain guide includes a plastic chain guide support having a substantially U-Shaped body with a channel formed along an inner surface of the body. The body typically includes an outer surface and a ridge structure protruding outward from the outer surface so as to reinforce the chain guide support. The body of the plastic chain guide support is generally configured with at least one mounting hole sized to receive a fastener for securing the chain guide to the frame of the motorcycle. Typically the plastic chain guide support further is configured to house a chain guide insert in at least a portion of the channel.

16 Claims, 5 Drawing Sheets

MOTORCYCLE CHAIN GUIDE

TECHNICAL FIELD

The present invention relates to a guide structure for guiding a chain to a sprocket of a motorcycle.

BACKGROUND

Some motorcycles utilize a chain to transmit power from the motor to a rear wheel. Under some conditions, such as when the distance between the front and rear sprocket is substantial, undesirable motion of the chain may occur. Such motion can interfere with the rider and/or motorcycle operations.

One solution to inhibit undesirable motion of the chain is a chain guide, which directs the chain between the front and rear sprocket. Chain guides typically include a metal channel secured to the frame of the motorcycle and a circular internal rubber insert through which the chain passes.

The inventors herein have found a disadvantage with such an approach. Specifically, conditions may exist wherein the metal chain guide is contacted or impacted during chain guide operation. During such impact, the metal chain guide may deform causing the channeled portion to collapse around the chain. If the deformation of the chain guide is permanent, the operation of the motorcycle may be impaired. Further, such deformation may also cause damage to the motorcycle or cause injury to the rider and bystanders. Under some conditions, it may be difficult to repair the deformed chain guide to the tolerances achieved during manufacture, thus causing potentially impaired performance.

SUMMARY

A chain guide for guiding a chain traveling around a sprocket supported on a frame of a motorcycle is provided. Typically, the chain guide includes a plastic chain guide support having a substantially U-Shaped body with a channel formed along an inner surface of the body. The body typically includes an outer surface and a ridge structure protruding outward from the outer surface so as to reinforce the chain guide support. The body of the plastic chain guide support is generally configured with at least one mounting hole sized to receive a fastener for securing the chain guide to the frame of the motorcycle. Typically the plastic chain guide support further is configured to house a chain guide insert in at least a portion of the channel.

One potential advantage of such a plastic chain guide is that the ridge structure may be designed to deform only temporarily upon impact while returning to its original state after the impact has occurred. In some embodiments, the ridge structure may include a plurality of ridge portions protruding from the surface of the chain guide support to further strengthen the chain guide and/or provide the desired elastic properties. Thus, after an impact has occurred, the chain guide may return to working order without further repair or replacement.

DETAILED DESCRIPTION OF THE PREFERRED EMBODIMENTS

Figure 1:
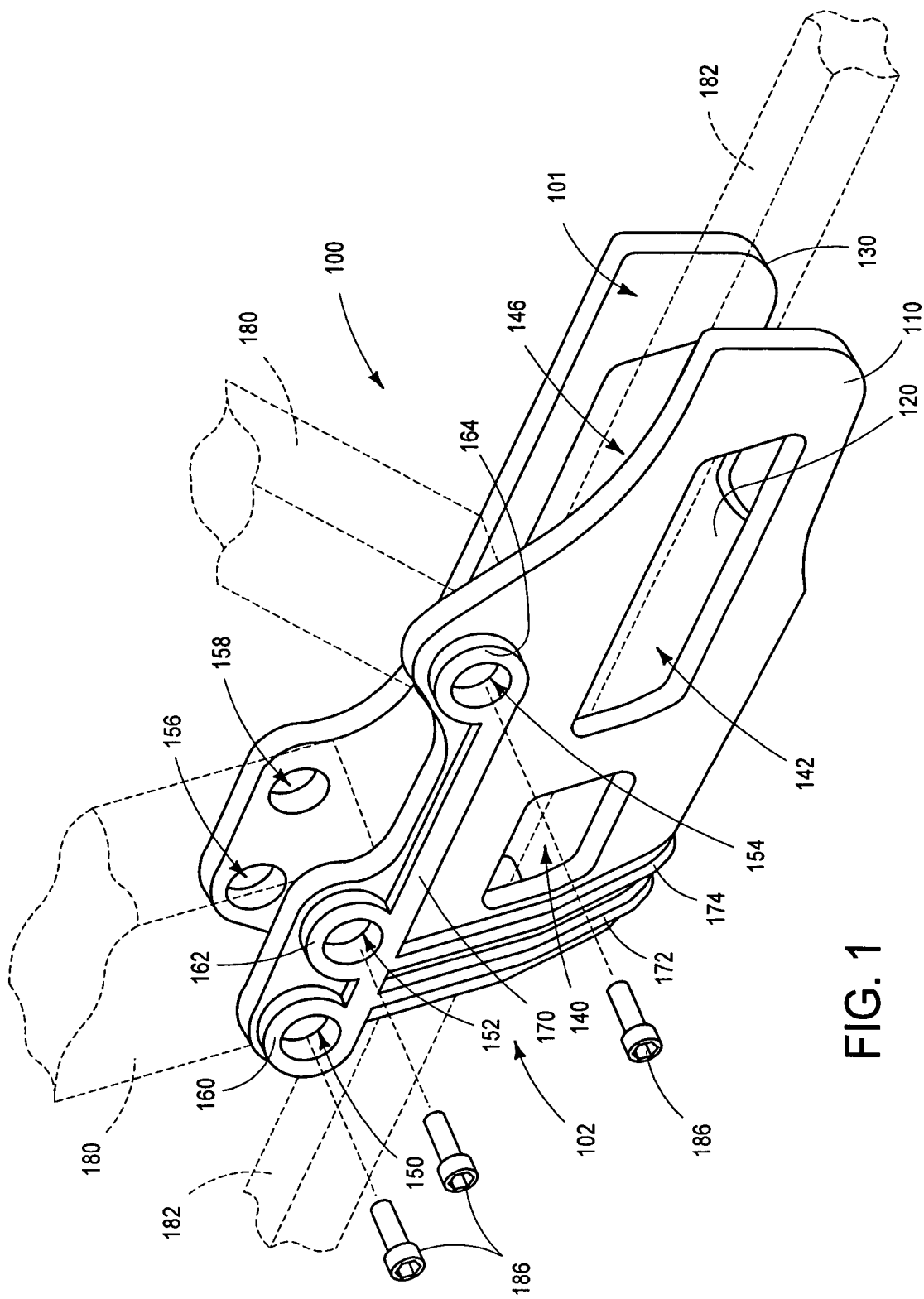
FIG. 1 is an isometric view of a chain guide according to a first example embodiment.

Referring now to FIG. 1, a chain guide according to one embodiment of the present invention is shown generally at 10. Chain guide 10 typically includes a plastic outer chain guide support 100 configured to mount to a motorcycle frame 180, as well as a chain guide insert 184 (see FIGS. 3, 6, and 7), which is typically made of rubber. Typically, chain guide support 100 is manufactured formed of a single piece of plastic, and mounts to motorcycle frame 180 via a plurality of mounting holes 150-158 and fasteners 186.

Chain guide support 100 includes a substantially U-shaped body having an outer wall 110, a bottom portion 120, and an inner wall 130. When the chain guide is mounted to motorcycle frame 180, the outer wall faces outward from the motorcycle, while the inner wall faces toward the motorcycle. Intermediate these walls, the U-shaped body has an elongate channel 101 formed along a length thereof. The channel is configured to house chain guide insert 184. The channel is further configured to surround and guide a chain 182, which slides over insert 184 and between walls 110 and 130.

Outer wall 110 is provided with openings 140 and 142 and inner wall 130 with openings 144 (see FIG. 4) and 146 for allowing expulsion of debris and/or foreign material during chain operation. Openings 140 and 144 are typically aligned with each other as viewed from the side, as are and openings 142 and 146, however, it will be appreciated that other configurations are possible.

Typically, the outer wall 110 is further provided with three mounting holes 150, 152 and 154, and the inner wall 130 is provided with two mounting holes 156 and 158. Mounting holes 150 and 156 are aligned with each other, as are mounting holes 152 and 158, to accommodate passage of fasteners 186. It will be appreciated that other suitable configurations of mounting holes may be provided to facilitate mounting of the chain guide support to motorcycle frames of various shapes and sizes.

Continuing with FIG. 1, the U-shaped body includes a ridge structure 102 projecting outward from the outer surface of the U-shaped body. Ridge structure 102 typically serves as a reinforcement means, and includes one or more ridge portions extending outward from outer wall 110, bottom portion 120, and/or inner wall 130. These ridge portions may be interconnected or formed adjacent each other, and are configured to strengthen the chain guide support against deformation and/or fracture during chain guide operation. Ridge portions of varying sizes, shapes, and/or number may be used to reinforce portions of the chain guide support that are susceptible to damage.

Typically, at least a portion of the ridge structure 102 is disposed adjacent an outer perimeter of the body of the plastic chain guide support. For example, ridge structure 102 may include a first ridge portion 172 disposed substantially parallel to and adjacent a front leading edge of the plastic chain guide support, and a second ridge portion 174 disposed parallel to and spaced apart from the first ridge.

In addition, at least a portion of the ridge structure is typically formed adjacent a mounting hole. For example, in the embodiment of FIG. 1, a plurality of circular mounting holes 150, 152 and 154 are provided in the outer wall 110 of the body of the plastic chain guide support, and the ridge structure includes a corresponding circular ridge portion 160, 162, 164 surrounding each of the mounting holes.

Each of the first and second ridge portions 172, 174 intersect at least one of the circular ridge portions. In addition, the ridge structure further includes a spanning ridge portion 170 that spans between at least two of the circular ridge portions. In the embodiment of FIG. 1, three mounting holes 150, 152 and 154 are provided on the body of the plastic chain guide support, and the spanning ridge portion includes a first spanning section between forward mounting hole 150 and intermediate mounting hole 152, and a second spanning section between the intermediate mounting hole 152 and an aft mounting hole 154.

The ridge structure further includes at least one ridge portion 178 (see FIGS. 3-7) disposed on a bottom surface of the plastic chain guide support substantially parallel to a direction of chain travel of the motorcycle, which may be referred to as a bottom ridge portion. Alternatively, the bottom ridge portion 178 may be oriented in another suitable direction. While typically the bottom ridge portion is formed independent of the remaining ridge portions in ridge structure 102, it will be appreciated that in some embodiments, such as shown in FIG. 8, a bottom ridge portion 878 may be provided that is interconnected with other ridge portions such as ridge portions 874, 876.

Figure 2:
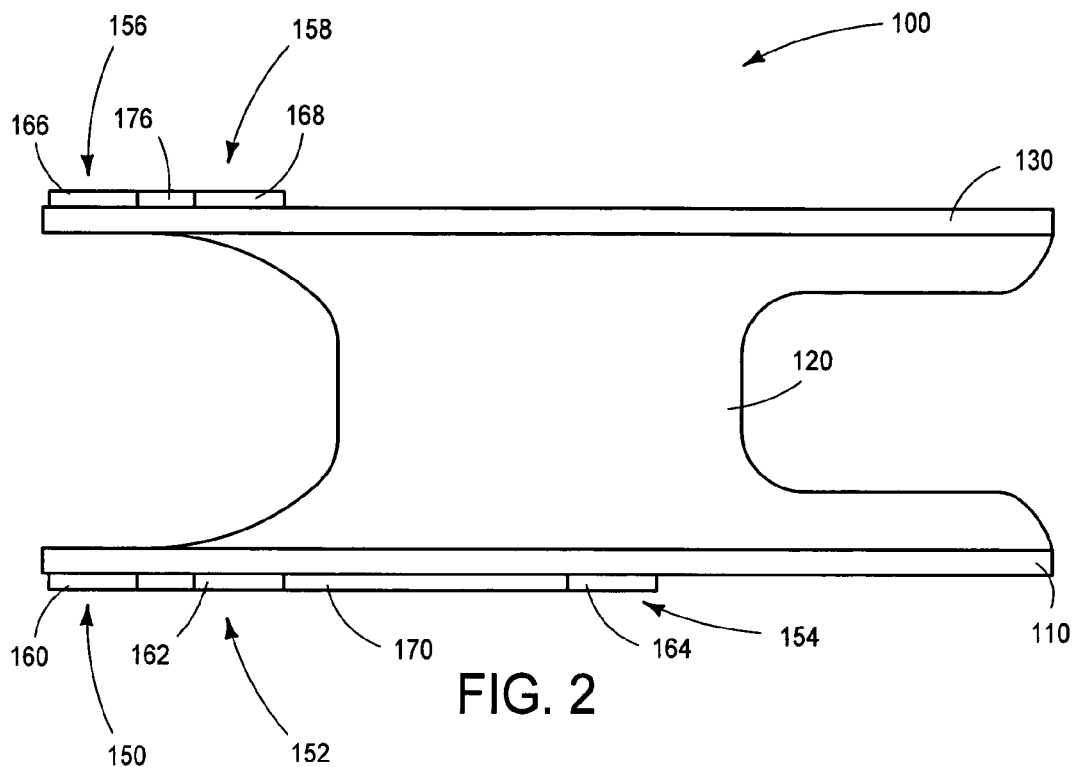
FIG. 2 is a top view of the chain guide of FIG. 1.

Referring now to FIG. 2, a top view of the first example embodiment of the chain guide support is shown. FIG. 2 shows the outer wall 110 and the inner wall 130 substantially parallel to each other and of approximately the same length. The bottom portion 120 is shown connecting the outer wall 110 and the inner wall 130. Circular ridge portions 160, 162, and 164 are shown projecting from the outer surface of the outer wall and circular ridge portions 166 and 168 are shown projecting from the outer surface of the inner wall. Spanning ridge portion 170 is shown projecting outward from the outer wall by approximately the same distance as the circular ridge portions and is shown intersecting circular ridge portions 160, 162, and 164. Spanning ridge portion 176 is shown projecting outward from the inner wall by approximately the same distance as the circular ridge portions and is shown intersecting circular ridge portions 166 and 168.

Figure 3:
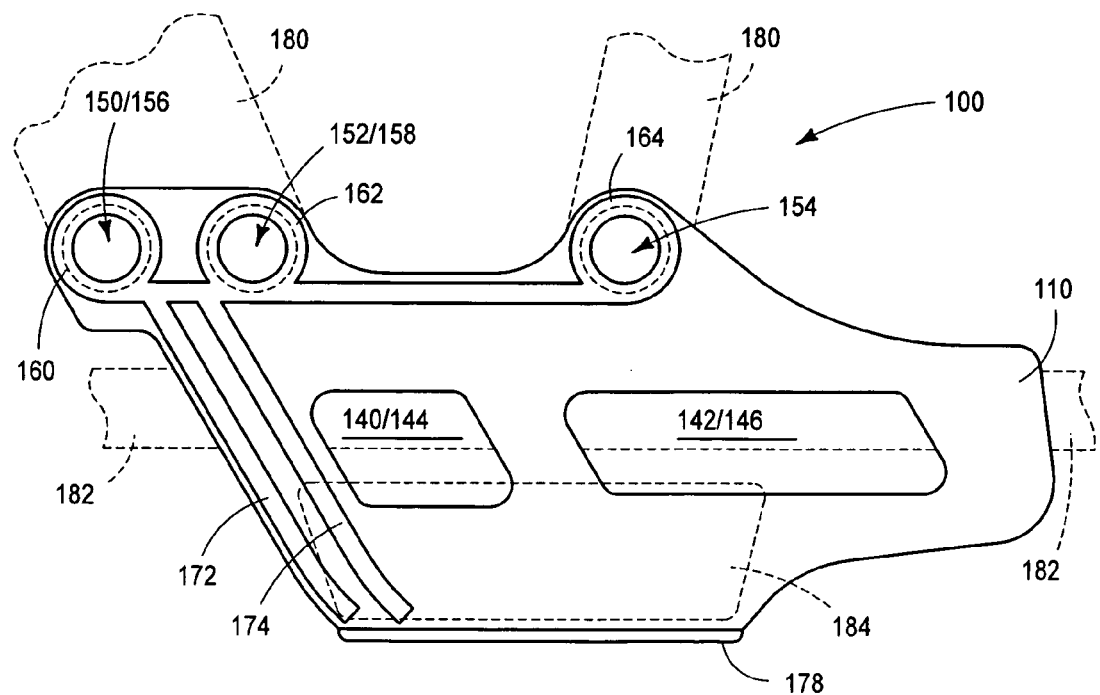
FIG. 3 is a left side view of the chain guide of FIG. 1.

Referring now to FIG. 3, a schematic diagram of a left side view of the first example embodiment of the chain guide support is shown. FIG. 3 shows that an outer perimeter of outer wall 110 is substantially aligned with the inner wall 130 (not shown), as viewed from the side. Further, opening 140 is shown to be substantially aligned with opening 144 and opening 142 is shown to be substantially aligned with opening 146. Openings 140, 142, 144, 146 are shown having a generally trapezoidal shape with rounded corners, however other shapes are possible. For example, the openings could be circular, triangular, or rectangular among others. Mounting hole 150 is shown to be substantially aligned with mounting hole 156 and mounting hole 152 is shown to be substantially aligned with mounting hole 158. Ridge portions 172 and 174 are shown arranged substantially parallel to each other and the front leading edge of the outer wall of the chain guide support. Bottom ridge portion 178 is shown projecting downward from the bottom of floor 120. In some embodiments (see FIG. 8), ridge portions 172 and 174 may intersect bottom ridge portion 178 in a manner similar to the intersection with spanning ridge portion 170.

Figure 4:
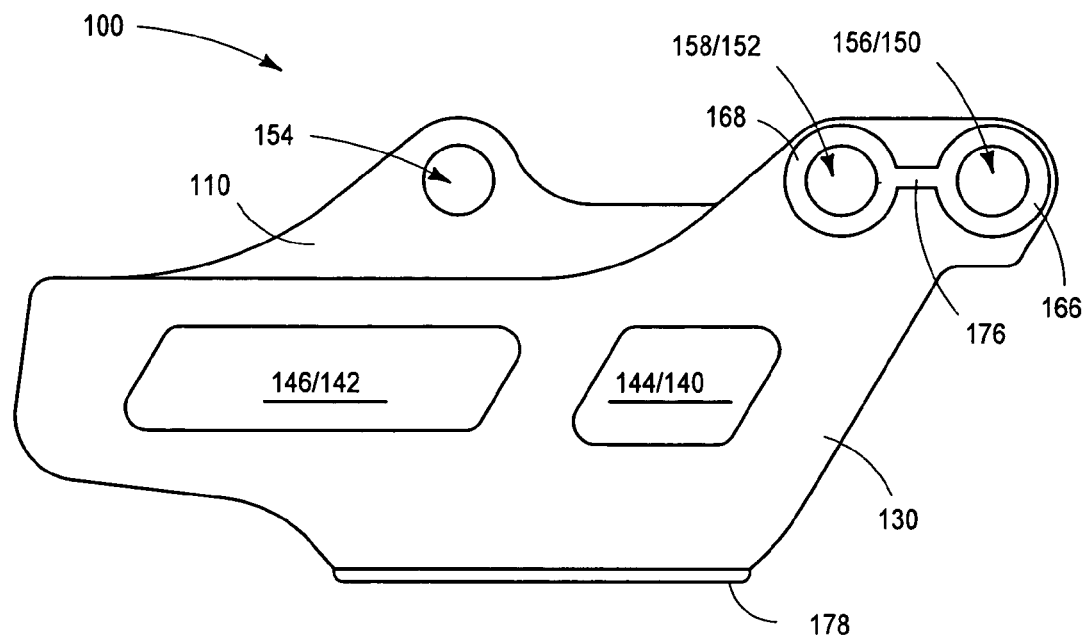
FIG. 4 is a right side view of the chain guide of FIG. 1.

Referring now to FIG. 4, a schematic diagram of a right side view of the first example embodiment of the chain guide support is shown. Spanning ridge portion 176 is shown intersecting circular ridge portions 166 and 168 at approximately the centerline of mounting holes 156 and 158. A portion of the outer wall 110 is shown behind the inner wall 130. In particular, mounting hole 154 is visible in FIG. 4.

Figure 5:
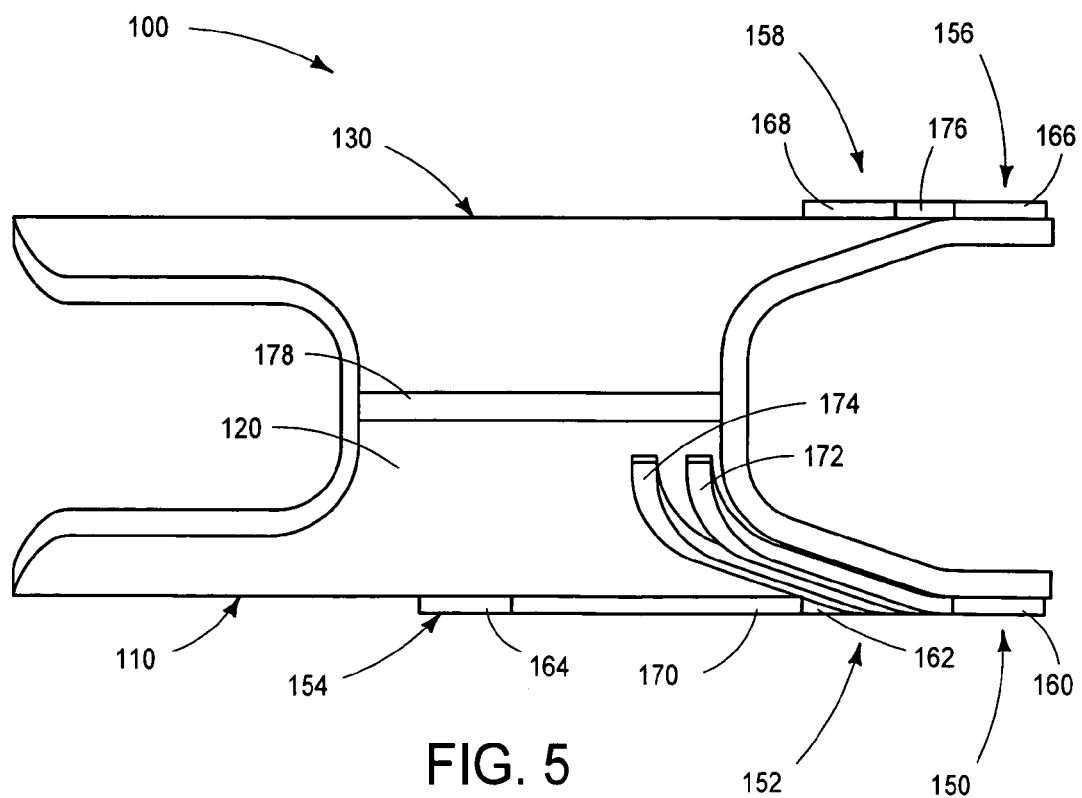
FIG. 5 is a bottom view of the chain guide of FIG. 1.

Referring now to FIG. 5, a schematic diagram of a bottom view of the first example embodiment of the chain guide support is shown. Ridge portions 172 and 174 are shown projecting outward from the outer wall 110 and tapering into the interface of the outer wall and the floor of the chain guide support prior to intersecting bottom ridge potion 178.

Figure 6:
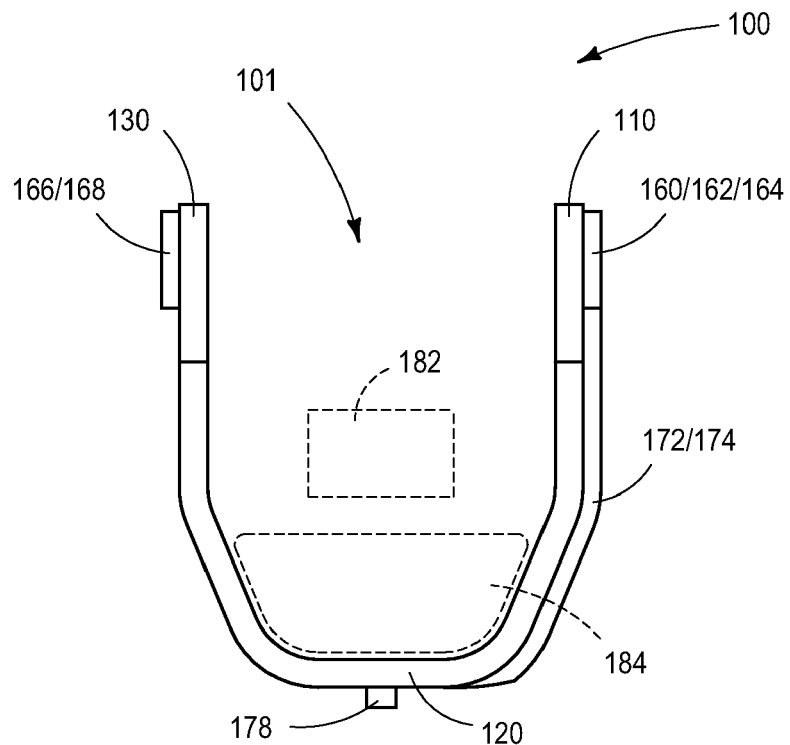
FIG. 6 is a front view of the chain guide of FIG. 1.
Figure 7:
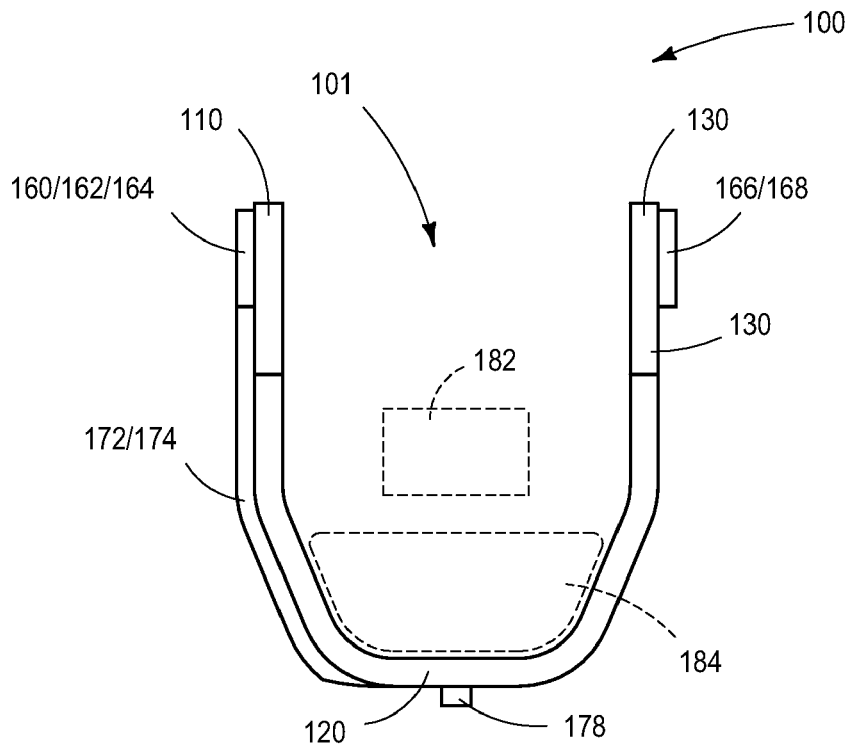
FIG. 7 is a rear view of the chain guide of FIG. 1.
Figure 8:
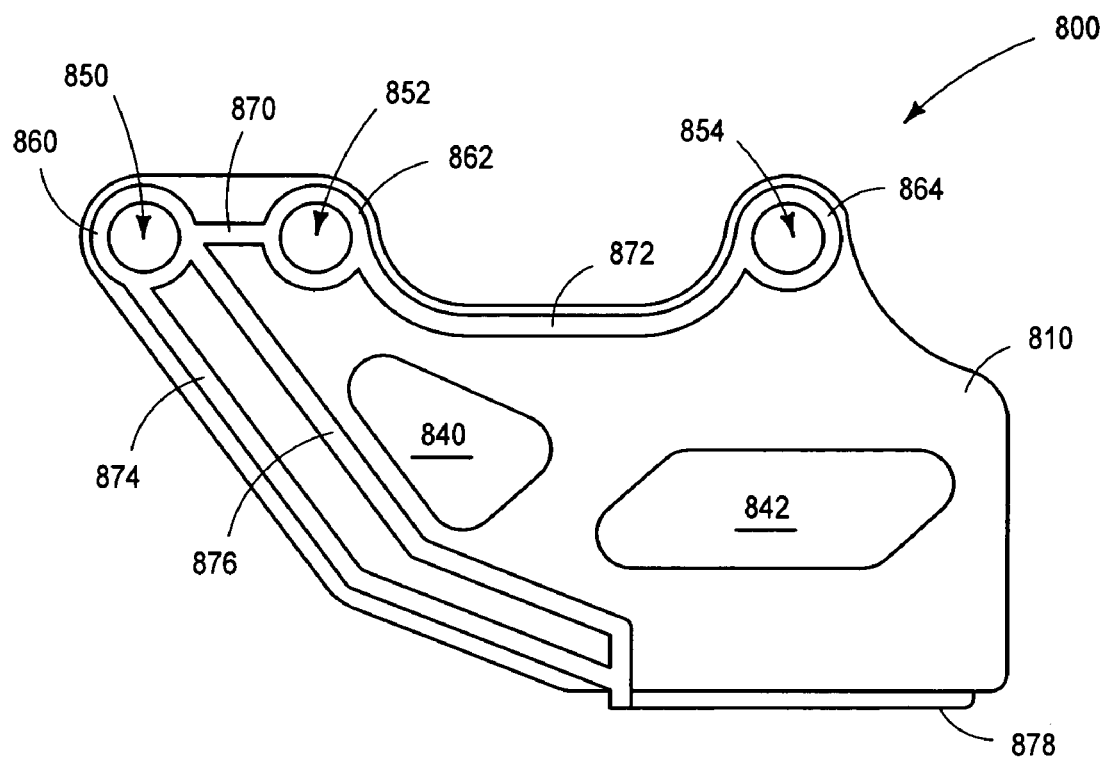
FIG. 8 is a left side view of a chain guide according to a second example embodiment.

Referring now to FIGS. 6 and 7, schematic diagrams of a front and rear view of the first example embodiment of the chain guide support are shown respectively. In particular, FIGS. 6 and 7 show how the various ridge portions of ridge structure 102 project outward from the surface of the outer wall 110, inner wall 130, and bottom portion 120 of the chain guide support. Ridge portions 172 and 174 are again shown tapering into the outer surface of the chain guide support, however in some embodiments, the ridge portions may end without tapering.

Referring now to FIG. 8, a schematic diagram of a left side view of a second example embodiment of the chain guide support is shown. Chain guide support 800 is shown with an outer wall 810 including two openings 840 and 842 for the expulsion of debris. Opening 840 is shown having a substantially triangular shaped opening with rounded corners, while opening 842 is shown having a trapezoidal shape. Further, circular ridge portions 860 and 862 are shown intersected by a first section 870 of a spanning ridge portion at approximately the centerline of mounting holes 850 and 852. Circular ridge portions 862 and 864 are shown intersected by a second section 872 of a spanning ridge portion. Further, the second section 872 of the spanning ridge portion is shown to substantially conform to the upper edge of outer wall 810 and is therefore curved so as to be upwardly concave. Ridge portions 874 and 876 are shown intersecting circular ridge portion 860 at the upper end. Further, ridge portions 874 and 876 are shown to be substantially parallel to each other and the leading edge of the chain guide support until intersecting at the lower edge of the chain guide support. Further, ridge portions 874 and 876 are shown intersecting bottom ridge portion 878, which projects downward from the bottom surface of the chain guide support.

Figure 9:
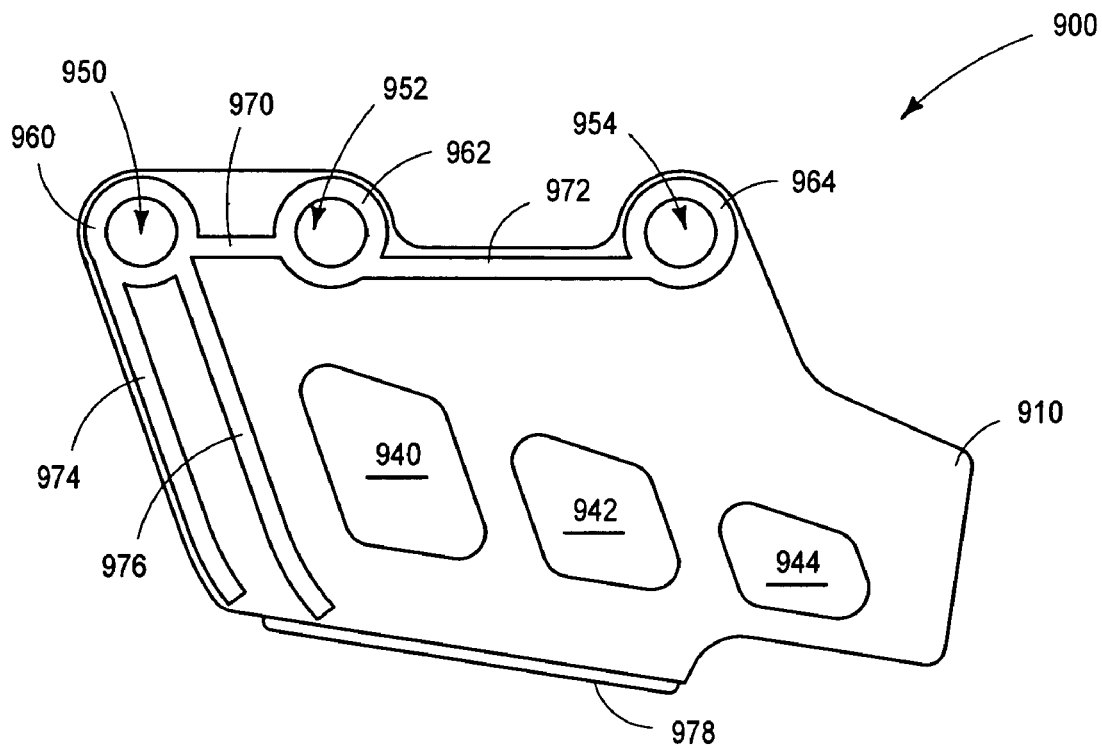
FIG. 9 is a left side view of a chain guide according to a third example embodiment.

Referring now to FIG. 9, schematic diagram of a left side view of a third example embodiment of the chain guide support is shown. Corresponding parts are labeled with references numbers similar to FIG. 8. For the sake of brevity, not all parts will be redescribed. FIG. 9 shows chain guide support 900 with an outer wall 910 having three openings 940, 942, and 944 each of different sizes and generally of trapezoidal shape. A spanning ridge portion is provided between mounting holes 950, 952, and 954, with a first section 970 and a second section 972. Ridge portions 974 and 876 are shown to intersect circular ridge portion 960, but not bottom ridge portion 978.

In some embodiments, the chain guide support may include variations in the features described above. For example, while the ridge structure is typically of a rectangular cross section throughout, it may alternatively be formed of a differently shaped cross section. In addition, the chain guide support may a different number of mounting holes, openings for expelling debris, etc. Further, the ridge structure may include more or fewer ridge portions than shown in the examples above. In some embodiments, all of the ridge portions may be of similar height and/or width. In other embodiments, some of the ridge portions may vary in height and width.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A chain guide for guiding a chain traveling around a sprocket supported on a frame of a motorcycle, the chain guide comprising:
    a plastic chain guide support having a substantially U-shaped body including an outer wall, a bottom portion, and an inner wall formed of a single piece of material with a channel formed along an inner surface of the body, the body including an outer surface and a ridge structure protruding outward from the outer surface in a direction extending away from the channel so as to reinforce the chain guide support;
    wherein the body of the plastic chain guide support is configured with at least two mounting holes, each of the mounting holes being sized to receive a respective fastener for securing the chain guide to the frame of the motorcycle, a first of the two mounting holes being positioned adjacent an intersection of a front leading edge and a top edge of the outer wall, and a second of the two mounting holes being positioned aft of the first mounting hole adjacent the top edge of the outer wall;
    wherein the front leading edge of the outer wall of the plastic chain guide support extends obliquely downward and rearward from a location adjacent the first mounting hole, to the bottom portion of the body;
    wherein the plastic chain guide support further is configured to house a chain guide insert in at least a portion of the channel in an orientation in which the chain guide insert is positioned inside of the body to be contacted on three sides, respectively, by the bottom portion, the inner wall, and the outer wall of the body, and in which a top surface of the chain guide insert is positioned below a chain running through the channel;
    wherein the ridge structure forms a region of increased cross-sectional thickness in the U-shaped body, and extends outward from the outer surface of the body in a direction that is substantially perpendicular to a longitudinal axis of the channel;
    wherein the ridge structure includes a first ridge portion located adjacent the front leading edge of the plastic chain guide support, and extending obliquely downward and rearward from a location adjacent the top edge of the outer wall to a location adjacent the bottom portion; and
    wherein the ridge structure includes respective portions surrounding the first and second mounting holes, and a spanning ridge portion formed adjacent the top edge of the outer wall and intersecting each of the portions of the ridge structure surrounding the first and second mounting holes, the first ridge portion also intersecting the portion of the ridge structure surrounding the first mounting hole.

2. The chain guide of claim 1, wherein at least a portion of the ridge structure is disposed adjacent an outer perimeter of the plastic chain guide support.

3. The chain guide of claim 2, wherein the first ridge portion is disposed substantially parallel to and adjacent the front leading edge of the plastic chain guide support.

4. The chain guide of claim 3, wherein the ridge structure includes a second ridge portion disposed parallel to and spaced apart from the first ridge portion.

5. The chain guide of claim 4, wherein each of the mounting holes is circular, and wherein the portions of the ridge structure surrounding each of the mounting holes are circular ridge portions.

6. The chain guide of claim 5, wherein each of the first and second ridge portions intersect at least one of the circular ridge portions.

7. The chain guide of claim 1, wherein three mounting holes are provided on the body of the plastic chain guide support, and the spanning ridge portion includes a first spanning section between a forward mounting hole and an intermediate mounting hole, and a second spanning section between the intermediate mounting hole and an aft mounting hole.

8. The chain guide of claim 1, wherein the ridge structure includes at least one ridge portion disposed on a bottom surface of the plastic chain guide support substantially parallel to a direction of chain travel of the motorcycle.

9. The chain guide of claim 1, wherein the plastic chain guide support further includes an opening in the outer wall of the U-shaped body, the opening being configured to allow expulsion of debris during chain guide operation.

10. The chain guide of claim 1, wherein the ridge structure is of a substantially rectangular cross section.

11. A chain guide for guiding a chain traveling around a sprocket supported on a frame of a motorcycle, the chain guide comprising:
    a plastic chain guide support having a substantially U-shaped body formed of a single piece of material with a channel formed along an inner surface of the body, the channel being bounded by an inner wall and an outer wall and a bottom portion of the U-shaped body, the body including an outer surface and a ridge structure protruding outward from the outer surface in a direction extending away from the channel so as to reinforce the chain guide support, the body further including a plurality of mounting holes positioned adjacent a top edge of the outer wall, each mounting hole being sized to receive a fastener for securing the chain guide to the frame of the motorcycle, a first mounting hole of the plurality of mounting holes being positioned adjacent an intersection of a front leading edge and the top edge of the outer wall, and a second mounting hole of the plurality of mounting holes being positioned aft of the first mounting hole adjacent the top edge of the outer wall;
    wherein the front leading edge of the outer wall of the plastic chain guide support extends obliquely downward and rearward from a location adjacent the first mounting hole, to the bottom portion of the body;
    wherein the ridge structure includes a first ridge portion disposed parallel to the front leading edge of the outer wall of the plastic chain guide support and extending obliquely downward and rearward from a location adjacent the top edge of the outer wall to a location adjacent the bottom portion, a second ridge portion disposed parallel to and spaced apart from the first ridge portion, a bottom ridge portion disposed on a bottom surface of the bottom portion of the U-shaped body, a plurality of circular ridge portions, each circular ridge portion surrounding a corresponding one of the first and second mounting holes, and a spanning ridge portion interconnecting the plurality of the plurality of circular ridge portions; the first ridge portion also intersecting the circular ridge portion surrounding the first mounting hole and/or the spanning ridge portion;

wherein the plastic chain guide support further is configured to house a rubber chain guide insert in at least a portion of the channel in an orientation in which the chain guide insert is positioned inside of the body to be contacted on three sides, respectively, by the bottom portion, the inner wall, and the outer wall of the body, and in which a top surface of the chain guide insert is positioned below a chain running through the channel; and wherein the ridge structure forms a region of increased cross-sectional thickness in the U-shaped body, and extends outward from the outer surface of the body in a direction that is substantially perpendicular to a longitudinal axis of the channel.

12. The chain guide of claim 11, wherein the first ridge portion, the second ridge portion, the bottom ridge portion and each of the circular ridge portions project outward from an outer surface of the plastic chain guide support by the same distance.

13. The chain guide of claim 12, wherein the first ridge portion, the second ridge portion, the bottom ridge portion and each of the circular ridge portions are of the same width.

14. The chain guide of claim 11, having three mounting holes on the outer wall of the plastic chain guide support and two mounting holes on the inner wall of the plastic chain guide support.

15. The chain guide of claim 11, wherein the first ridge portion and the second ridge portion intersect at least the bottom ridge portion.

16. The chain guide of claim 11, wherein the first ridge portion and the second ridge portion intersect at least a circular ridge.

* * * * *